United States Patent [19]

Oie et al.

[11] Patent Number: 5,502,143
[45] Date of Patent: Mar. 26, 1996

[54] PROCESS FOR PREPARING POLYIMIDE RESINS

[75] Inventors: Yoshihiro Oie, Tokyo; Hiroshi Itatani, Chiba, both of Japan

[73] Assignee: PI Material Research Laboratory, Kanagawa, Japan

[21] Appl. No.: 466,729

[22] Filed: Jun. 6, 1995

Related U.S. Application Data

[63] Continuation-in-part of Ser. No. 166,916, Dec. 15, 1993, abandoned.

[30] Foreign Application Priority Data

Dec. 25, 1992 [JP] Japan ................................ 4-358909
Dec. 2, 1993 [JP] Japan ................................ 5-339549

[51] Int. Cl.$^6$ ................................ C08G 77/08
[52] U.S. Cl. ................ 528/12; 528/21; 528/26; 528/38; 528/351; 528/353
[58] Field of Search ................ 528/12, 21, 26, 528/38, 351, 353

[56] References Cited

U.S. PATENT DOCUMENTS

| | | | |
|---|---|---|---|
| 4,011,279 | 3/1977 | Berger et al. | 528/23 |
| 4,330,666 | 5/1982 | White et al. | 528/207 |
| 4,362,863 | 12/1982 | Kojima et al. | 528/353 |
| 4,395,527 | 7/1983 | Berger | 528/26 |
| 4,448,957 | 5/1984 | Ueno et al. | 528/351 |
| 4,681,928 | 7/1987 | Berger et al. | 528/353 |
| 4,701,511 | 10/1987 | Valenty | 528/26 |
| 4,754,016 | 6/1988 | Ai et al. | 528/336 |
| 5,009,934 | 4/1991 | Wenski et al. | 427/387 |
| 5,068,307 | 11/1991 | Hara et al. | 528/15 |
| 5,202,411 | 4/1993 | Itatani | 528/353 |
| 5,414,070 | 5/1995 | Yang et al. | 528/310 |
| 5,442,024 | 8/1995 | Kunimune et al. | 528/12 |

FOREIGN PATENT DOCUMENTS

| | | |
|---|---|---|
| 046074 | 2/1982 | European Pat. Off. . |
| 2295978 | 7/1976 | France . |
| 3077865 | 6/1991 | Japan . |
| 3-77865 | 6/1991 | Japan . |

OTHER PUBLICATIONS

D. Wilson et al, Polyimides, "Synthesis of aromatic polyimides from dianhydrides and diamines", pp. 227–250.

Akira Suzuki et al, Die Angewandte Makromolekulare Chemie 66 (1978) 181–191 (Nr. 978), "Synthesis and Properties of Polyesterimides Containing a Bicyclooctene Ring".

*Primary Examiner*—John C. Bleutge
*Assistant Examiner*—Margaret W. Glass
*Attorney, Agent, or Firm*—Nikaido, Marmelstein, Murray & Oram

[57] ABSTRACT

Polyimide soluble in an organic polar solvent was prepared by heating the solution in the presence of a binary catalyst having low boiling point. Block copolyimides consisting of more than three components were prepared by the sequential addition process in the presence of the binary catalyst. Polyimide resins were prepared without the separation of polyimides and catalysts because of evaporating consequently catalysts and solvent. The binary catalyst comprise one compound selected from γ-valerolactone and crotonic acid, and one compound selected from pyridine and N-methylpyrrolidone.

16 Claims, 10 Drawing Sheets

PROCESS FOR PREPARING POLYIMIDE RESINS

This is a continuation-in-part application of U.S. Ser. No. 08/166,916 filed on Dec. 15, 1993, now abandoned.

FIELD OF THE INVENTION

The invention relates to a method of making polyimide resins which have advantage in addition to excellent properties of two component polyimides. Particularly, polyimide resins consisting of a block copolymer are used in various fields as materials having high heat resistance and good electrical insulation properties.

PRIOR ART

Polyimide resins have high resistance to heat and chemicals, and also outstanding mechanical, electrical insulating properties. Polyimide resins are used as heat-insulating film, adhesives, coating agents, molding resins and laminating resins, and have found in recent years applications to electric or electronic materials, space aeronautic materials, automotive parts and components of special devices or apparatus.

Polyimide resins have the advantages of being excellent in physical properties, being available in the form of resins of high purity as prepared from materials of high purity by condensation. At present, improvements achieved in the mechanical and electrical characteristics and other properties of polyimides have led to wider use of the resins. Further attempts are made to give higher dimensional stabilities and impact resistance, increased storage stability and improved properties for use as gas permeation membranes and also to impart adhesive properties to the resins.

Generally, polyimides are made by mixing equal moles of highly pure acid dianhydride and diamine, running a polycondensation reaction in a polar solvent at low temperature to form a high molecular weight polyamic acid, followed by casting the polyamic acid solution, and finally running a dehydration/ring closure reaction by heating or by chemical treatment (Polyimides; D. Wilson, H. D. Stenzenberger, P. M. Hergenrother; Blackie and Sun Ltd. (New York) (1990) pp. 1–31).

The two-step polycondensation process via polyamic acid which is used for production of conventional polyimide resins has certain disadvantages. For example, it forms a thermally unstable high molecular weight polyamic acid as an intermediate using high purity of acid anhydride and diamine, and an absolutely dehydrated polar solvent at a lower temperature than room temperature, and then the intermediate undergoes dehydration/ring closure reaction at 230°–260° C. causing fission of the molecular chain. The dehydrated surface of the film is not flat due to the effect of the evaporation of water.

Exchange reactions between the amic acid groups in molecules easily occur in a solution. As a result, the end product shows characteristic of random copolymers.

Random copolymers exhibit the properties of the individual component on the average rather than exhibiting the excellent properties of one of the component, so that modification to the block copolymer is more useful than modification to the random copolymer. For example, polyurethane resins are made into block copolymers for modification. Modification of polyamide-imide to a block copolymer is also reported (Unexamined Japanese Patent Public Disclosure No. 34300/1976).

Direct imidation process is limited to apply for polyimides soluble in a polar solvent.

From the facts that the polyimide in a polar solvent is so stable that the imide bonds in molecules do not take place the bond fission of the imide and also do not exchange the imide bonds between other polyimide molecules, polyimides are prepared by one step imidation based on a sequential addition technique in order to obtain polyimide block copolymer while excluding random copolymer. For example, tricomponent polyimide block polymer formed by reacting about two molar equivalents of an acid dianhydride and less than about one molar equivalent of first diamine to form an imide intermediate which has acid anhydride group at both ends, followed by reacting with a second diamine.

To obtain a modified polyimide, it is also known to prepare a block and segment block copolyimide with use of a mixture of phenolic solvent such as a mixture of phenol and methoxyphenol or a mixture of phenol and 2,4-dimethylphenol. This procedure produced gas permeable membranes which have outstanding gas permeability (U.S. Pat. No. 5,202,411).

It is also reported that an acid dianhydride and a diamine are heated at 180°–200° C. in a polar solvent in the presence of an acid catalyst for direct imidation (U.S. Pat. Nos. 4,011,279; 4,681,928 and 4,395,527; Abe Berger et al.).

This acid catalyst is an unvolatile compound such as p-toluene sulfonate. A sequential addition process formed organosiloxane block polyimides which are precipitated in excess methanol, recovered and then resolved in methylenechloride as 10% concentrated solution while removing acid catalyst.

Acid catalysts remained in polyimide resins decrease characteristic properties of polyimides which, for example, cause decreasing adhesivity, coloration, acceleration of decomposition at high temperature.

Imidation between an aliphatic dianhydride and a diamine effected by the addition of acid having higher dissociation constant than aliphatic tetracarboxylic acid—such as nitric acid or benzoic acid (U.S. Pat. No. 4,362,863). It is difficult to evaporate the benzoic acid (b.p. 249° C.) with the solvent used.

Direct imidation between an aromatic dianhydride and an aromatic diamine was reported at 100°–220° C. in a polar solvent in the presence of a carboxylic acid such as acetic acid or benzoic acid [Fr. A-2295978].

The condensation products obtained were not analyzed their chemical configuration. Polycondensation with acetic acid at 100° C. for 90 minutes formed polyamic acid but not polyimide as shown in Reference Example in our report.

SUMMARY OF THE INVENTION

The main object of the present invention is to provide a process of preparing polyimide resins having a high molecular weight and good storage stability by heating in a polar solvent in the presence of a binary catalyst. The block polyimide resins having over three components are prepared by an imidation reaction based on a sequential addition technique and without any special separation process of polyimides and a binary catalyst.

The block copolyimide resins having high purity are prepared by a heating process of the obtained polyimide solution, removing both catalysts and polar solvents by heat evaporation.

Other objects and advantages of the present invention may become apparent to those skilled in the art from the following description and disclosure.

DETAILED DESCRIPTION OF THE INVENTION

Figure 1:
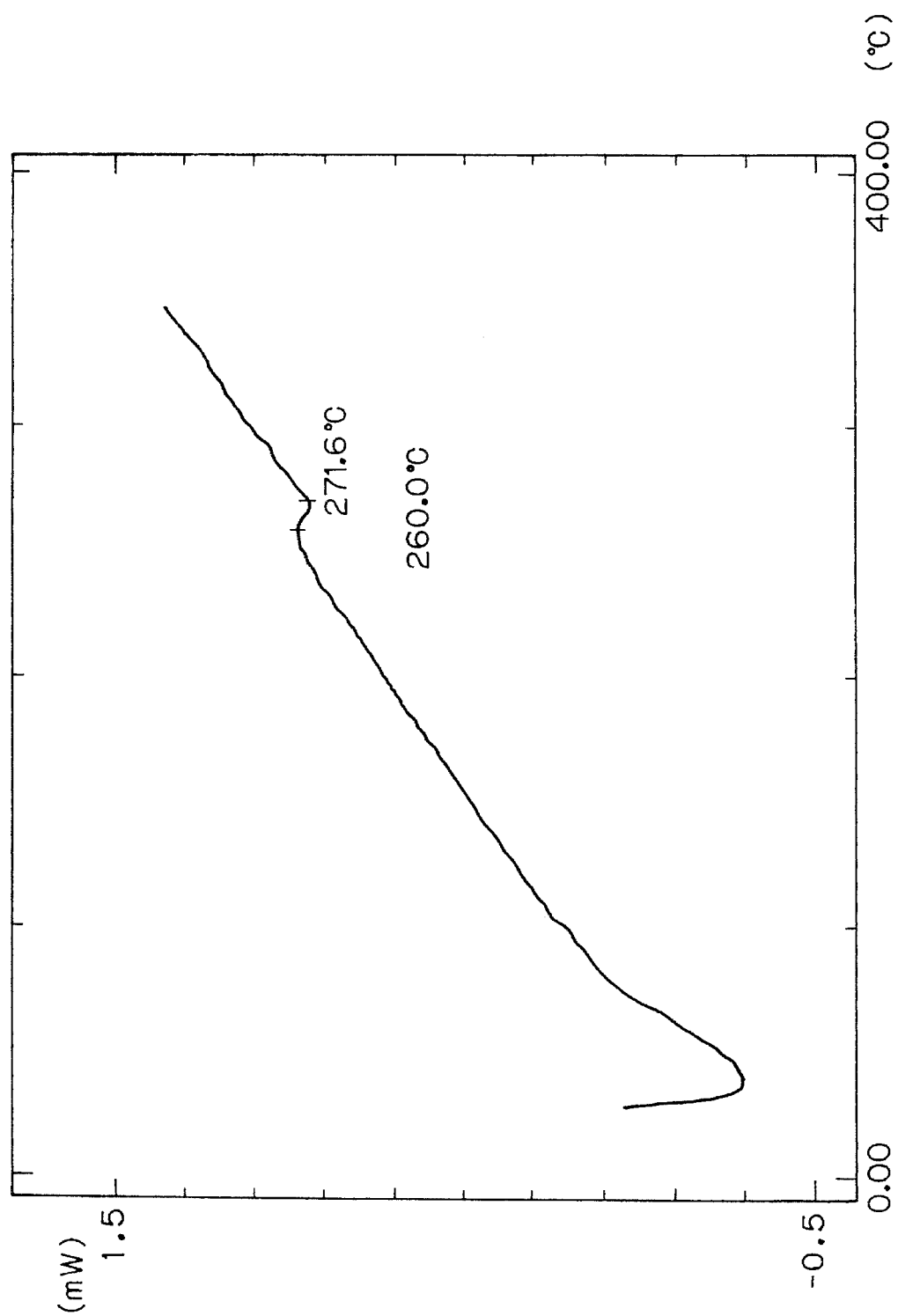
FIG. 1 is a diagram for the DSC curve of the polyimide resin as produced in Example 1.

In the present invention, imidation reaction of a diamine with an acid dianhydride in an organic polar solvent is accelerated in the presence of a binary catalyst consisting of a carboxylic acid having low boiling point and a base having low boiling point.

The high pure polyimide resins are formed directly by the heating process of the obtained polyimide solution, removing simultaneously the catalyst and the polar solvent by evaporation. Block copolyimides having over three components are prepared by directly imidation reaction using the binary catalyst.

The polar solvent for use in preparing the soluble polyimide are N,N-dimethylformamide (hereinafter referred to as DMF), N,N-dimethylacetamide, N-methyl-2-pyrrolidone (referred to as NMP), N-acetylmorpholine, and tetramethyl urea. DMF having b.p. 153° C. is too toxic to use in the closed system. NMP having b.p. 202° C. is a preferable solvent because of reduced toxicity.

The imidation reaction in a polar solvent is catalytically accerelated in the presence of a binary catalyst having low boiling point to give high yield of polyimide having high purity.

The binary catalysts comprise the first component is a compound selected from the group consisting of γ-valerolactone (b.p. 206° C.) and crotonic acid (b.p. 181° C.) and the second component is a compound selected from the group consisting of pyridine (b.p. 116° C.) and N-methyl morpholine (b.p. 116° C.), said first component being about 0.01–0.2 mole per mole of the acid dianhydride and said second component being about 1–2 moles per mole of the first component.

The binary catalyst is one member selected from the group consisting of γ-valerolactone-pyridine, γ-valerolactone-N-methyl morpholine, crotonic acid-N-methyl morpholine and crotonic acid-pyridine.

The preferable binary catalyst is γ-valerolactone-pyridine or crotonic acid-N-methyl morpholine.

γ-Valerolactone has the following equilibrium in the presence of a base and water;

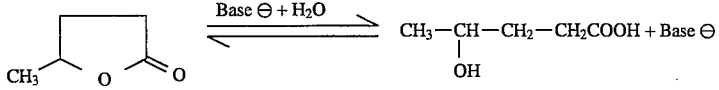

A carboxylic acid formed in the presence of a base exhibits excellent catalytic behavior in the imidation reaction.

By removing base and water by evaporation, the carboxylic acid is converted to γ-valerolactone which shows no activity of catalysis and which exhibits no substantial decrease in characteristic properties of polyimides.

The polyimide solution obtained in e.g., N-methylpyrrolidone was formed the pure polyimide resins by heating at 180°–210° C., removing simultaneously NMP and the binary catalyst by evaporation. The pure polyimide resins obtained are not contained catalysts. This imidation reaction is preferable because a special separation process of catalysts and polyimides is not necessary.

The present invention includes the following modes. In the process for preparing polyimide resins comprising:

a) reacting one mole of a first diamine with about 2 to 10 moles of an acid dianhydride in an organic polar solvent at the temperature from 140°–220° C. in the presence of a binary catalyst to directly form an imide oligomers containing more than 80% by weight of an imide monomeric unit;

b) reacting the imide oligomers with a second diamine so that the total amount of the first diamine and the second diamine is almost equivalent in moles to the acid dianhydride in the reaction solution at the temperature from 140° C. to 220° C. to form directly a polyimide block polymer solution;

c) preparing directly polyimide resins from polyimide block polymer solution by evaporation, thereby removing both the solvent and the binary catalyst.

On the other hand, in the another process for preparing polyimide resins comprising:

a) reacting one mole of a first acid dianhydride with about 1.2 to 3 moles of a diamine in an organic polar solvent at the temperature from 140° C. to 220° C. in the presence of a binary catalyst to directly form an imide oligomers;

b) reading the imide oligomers with a second acid dianhydride so that the total amount of the first acid dianhydride and the second acid dianhydride is almost equivalent in moles to the diamine in the reaction solution at the temperature from 140°–220° C. to form directly a polyimide block polymer solution;

(c) preparing directly polyimide resins from polyimide block polymer solution by evaporation, thereby removing both the solvent and the binary catalyst.

In accordance with a preferred aspect in any of the processes of this invention, a hydrocarbon may be further added to the reaction solution in an amount of about 20–50 parts by weight to one part by weight of formed water to facilitate removing the water by azeotropic distillation from the reaction solution during the reaction. The hydrocarbons are selected from the group consisting of toluene, xylene and tetrahydronapthalene.

Although the acid dianhydride to be used in the present invention is not limited specifically, examples of useful acid dianhdyrides are as follows.

Biphenyltetracarboxylic dianhydride, benzophenonetetracarboxylic dianhydride, 4,4'-[2,2,2-trifluoro- 1-(trifluoromethyl)ethylidene]-bis-(1,2-benzene dicarboxylic dianhydride), bis(dicarboxyphenyl)ether dianhydride and bicyclo(2,2,2)-oct-7-ene-2,3,5,6-tetracarboxylic dianhydride.

These compounds can be used simply or at least two of them are usable for preparing a polyimide composition.

Useful diamines are not limited specifically and include, for example, the following compounds.

1,4-Benzenediamine, 6-methyl-1,3-benzenediamine, 4,4'-diamino-3,3'-dimethyl-1,1'-biphenyl, 4,4'-amino-3,3'-dimethoxy-1,1'-biphenyl, 4,4'-methylene bis(benzeneamine), 4,4'-oxybis(benzeneamine), 3,4'-oxybis(benzeneamine), 4,4'-thiobis(benzeneamine), 4,4'-sulfonyl(benzeneamine), 3,3'-sulfonyl(benzeneamine), 1-trifluoromethyl-2,2,2-trifluoro-ethylidene- 4,4'-bis(benzeneamine), 2,2-bis(4-(4-amino-phenoxy)phenyl)propane, bis(4-(3-aminophenoxy)phenyl)sulfone, 1,3-bis[1-(4-aminophenyl)-1-methylethylidene]benzene, 1,4-bis(4-aminophenoxy)benzene, 1,3-bis(3-aminophenoxy)benzene, 9,9-bis(4-aminophenyl)fluorene and diaminosiloxane. These compounds can be used singly, or at least two of them are usable for preparing the polyimide composition.

Block polyimide can be modified to suit a desired application by complimenting an inferior properties of two component polyimides while retaining its original function. For example, block polyimides are available which have an improved modules of elasticity, higher dimensional stability, adhesiveness, improved transparency, enhanced mechanical strength and other characteristics imparted thereto.

The block polyimide obtained by the present invention contains no polyamic acid, is therefore stable against heat or moisture, and can be stored for a prolonged period of time. The composition is used in various forms known in the art. For example, it is usable in the form of heat-resistant films and as an adhesive, coating composition and lamination resin. It is applicable to electrical or electronic materials, space aeronautic materials, automotive parts and components of special devices or apparatus.

Block polyimide solution is dissolved in NMP or like can be used as it is as a coating material for protecting the surface of various electronic devices. The solution is usable also for a wiring structure for electronic circuits including, for example, semiconductors, transistors, ICs, light-emitting diodes and LSIs, and as an electrically conductive paste when having a conductive filler incorporated therein.

The block copolymer solution is further useful as a coating varnish for dip-coating electric wires, magnet wires and electric parts and for forming protective coatings on metal parts, and as an impregnating varnish for glass cloth, silica cloth, graphite fiber, carbon fiber and boron fiber. It is useful as a structural component of laser domes, printed boards, radioactive waste containers, turbine blades, spaceships of which high-temperature characteristics and excellent electrical characteristics are required, etc. and for internal finishing materials for computer wave guides, atomic devices of apparatus and X-ray devices to block microwave or radiation. The block copolymer is usable in exactly the same manner as a usual coating composition of such a type.

The block polyimide solution is useful also as a molding material with graphite powder, graphite fiber, molybdenum disulfide, polyethylene tetrafluoride, or the like incorporated therein to provide self-lubricating slidable surfaces, and is used also for piston rings, valve seats, bearings, seals, etc. The composition, when glass fiber, graphite fiber, carbon fiber, Kevlar or the like added thereto, is useful for jet engine parts and structural molding of high strength.

Polyimide varnish for spray coating

Solutions of polyimide as dissolved in NMP or like polar solvent having a high boiling point are used as varnishes for dipping. However, in the case where the workpiece is dipped in the varnish and heated to evaporate off the solvent, the varnish will sag if applied to a large thickness (30–60 μm), so that the varnish is not usable for spraying.

When the spray coating method is used instead of the impregnation method, workpieces of small sizes can be coated efficiently uniformly.

To prevent sagging, the varnish of high concentration needs to be diluted with a diluent having a low boiling point to a lower viscosity. Generally, high-molecular-weight polyimide solution compositions are highly viscous and difficult to use for spraying. The viscosity of the polyimide varnish can be reduced by lowering the molecular weight of the polyimide or increasing the content of siloxane or BCD.

According to the present invention, the above requirement is fulfilled in the following manner.

The imidization polycondensation reaction with use of catalysts proceeds much more rapidly at a high concentration than at a low concentration, and the method of controlling the molecular weight by interrupting the polymerization reaction encounters extreme difficulty in polyimide solutions of high concentration and is uncertain in reproducibility. To lower the degree of polymerization for the control of molecular weight, therefore, the present invention employs a method of bringing the polyimide forming reaction to an equilibrium by blocking the polyimide ending with a reaction terminator group.

The method wherein the acid dianhydride or diamine is used in a stoichiometrically excess amount to interrupt polymerization has the drawbacks that the resulting polyimide is wide in molecular weight distribution and that the reaction system requires a long period of time to reach an equilibrium concentration. Accordingly, it is effective to control the molecular weight of the polyimide to be produced by adding as a shortstop a calculated amount of an acid anhydride such as phthalic anhydride, bicyclo[2,2,1]hept-5-ene-2,3-dicarboxylic anhydride or maleic anhydride.

For example, it is suitable for a polyimide solution with a concentration of 35% weight to have a relatively lower molecular weight as large as 10,000 to 50,000, preferably 10,000 to 30,000 based on the standard polystyrene molecular weight for use as a composition for spray coating.

To render a high-concentration polyimide solution usable as a low-viscosity varnish by spraying free of sagging, there arises a need to select suitable solvent. Examples of good solvents having high dissolving properties for use in solutions of polyimide as dissolved in NMP or like polar solvent are dioxane, γ-butyrolactone, dimethyl ethylene glycol, etc. Toluene, xylene and tetrahydronaphthalene are usable as bad solvents for gelation. The viscosity of the polyimide solution is adjusted to 60 cp (about 30 sec. in Ford cup viscosity) for spraying by adding a mixture of such good solvent and bad solvent to the solution. The solution then becomes applicable to ceramics, glass and metals by spray coating.

EXAMPLES

The examples, which was given for the illustrative purposes, are not meant to limit the invention described herein.

According to the present invention, the acid dianhydride and diamine is reacted to form quantitatively a polyimide, when used in precisely equivalent mole and even when the mixing ratio is slightly altered.

When the polyimide solution resulting from the reaction is added to a non solvent, for example, to methanol or hexane, the polyimide precipitates in the form of a powder or a solid product, which can be collected quantitatively.

The polyimide solution is characterized by its viscosity, color, specific gravity, concentration, solid content, etc. The solution composition can be used directly in the form of films, coating, adhesives, moldings and the like, for example, by casting the solution or dipping workpieces therein, and then evaporating off the solvent present.

When the polyimide solution is added to an excess of methanol to precipitate a solid or is cast into a film, the solid or the film is usable for determining characteristic properties thereof. IR absorption spectrum of the polyimide was determined on KBr disk by infrared spectrometer "Nicolet 510 Ft". The characteristic peaks based on the imide was observed near 1780, 1720, 1370, and 720 $cm^{-1}$. The spectrum revealed disappearance of absorption peak at 1650 $cm^{-1}$ based on the amide of polyamic acid. Calculation based on the absorption peak of 1780 $cm^{-1}$ substantiated nearly 100%

The thermal decomposition temperature and the glass transition temperature (Tg) were measured by "TAG-50" and "ASC-50" manufactured by Shimazu Seisakusho, Ltd. The glass transition temperature (Tg), in particular, was determined by heating the sample to 420° C. at a rate of 10° C./min, then cooling in nitrogen and heating the sample again to 420° C. at a rate of 10° C./min. The Tg value shown was obtained the second heating step.

In the following description, inherent viscosity is defined as follows:

$$= \frac{ln(t/to)}{0.5}$$

In the above equation, t is the falling velocity of the polymer solution (sample 0.5 g of the sample was dissolved in 100 ml of NMP), and to is the falling velocity of NMP at 30° C.

EXAMPLE 1

A stainless steel anchor agitator, nitrogen introduction tube and reflux condenser were attached to a 1-liter three-necked separable flask, the condenser comprising a trap having a stopcock, and a cooling tube having balls and mounted on the trap. While introducing nitrogen into the flask, the flask was heated by being immersed in a silicon bath provided with a temperature adjusting device. The temperature of the bath was given as the reaction temperature.

Placed in the flask were 64.44 g (200 mmoles) of 3,4,3',4'-benzophenonetetracarboxylic dianhydride (molecular weight 322.23, product of Chimie Linz Ges. m.b.H., hereinafter referred to as "BTDA"), 12.22 g (100 mmoles) of 2,4-diaminotoluene (molecular weight 122.17, product of Tokyo Kasei Co., Ltd.), 2.2 g (25 mmoles) of crotonic acid (molecular weight 86.09, product of Kanto Kagaku), 2.0 g (25 mmoles) of pyridine (product of Kanto Kagaku), 300 g of N-methylpyrrolidone (product of BASF Japan, hereinafter referred to as "NMP") and 100 g of toluene (product of Kanto Kagaku). While introducing nitrogen into the flask, the solution was stirred at room temperature for 1 hour (200 r.p.m.) and then heated at 180° C. for 1 hour with stirring with toluene-water refluxed.

The mixture was cooled in air, and then 43.25 g (100 mmoles) of bis[4-(3-aminophenoxy)phenyl]sulfone (molecular weight 432.5, product of Wakayama Seika, hereinafter referred to as "m-BAPS"), 300 g of NMP and 50 g of toluene were added to the reaction mixture. The resulting mixture was stirred at room temperature for 1 hour and at 140° C. for 1 hour, and heated at 180° C. for 3 hours with stirring. One hour after the start of heating at 180° C., toluene-water collecting in the trap (15 ml volume) with a stopcock was removed, and water formed and toluene refluxed were removed during the reaction.

The reaction gave a solution of block polyimide composed of the three components, i.e., BTDA, 2,4-diaminotoluene and m-BAPS.

The polyimide solution cooled was cast onto a stainless steel plate and dried at 150° C. in an oven having an IR lamp, whereby a polyimide film was formed over the stainless steel plate.

A cross-cut test conducted revealed that the polyimide film exhibited strong adhesion and was not separable from the plate.

When the polyimide solution was poured into a large amount of methanol, followed by stirring in a mixer, a yellow polyimide powder separated out.

A 112 g quantity of polyimide was obtained by filtering off, washed with methanol, and drying the powder (at 150° C. in a vacuum).

Figure 2:
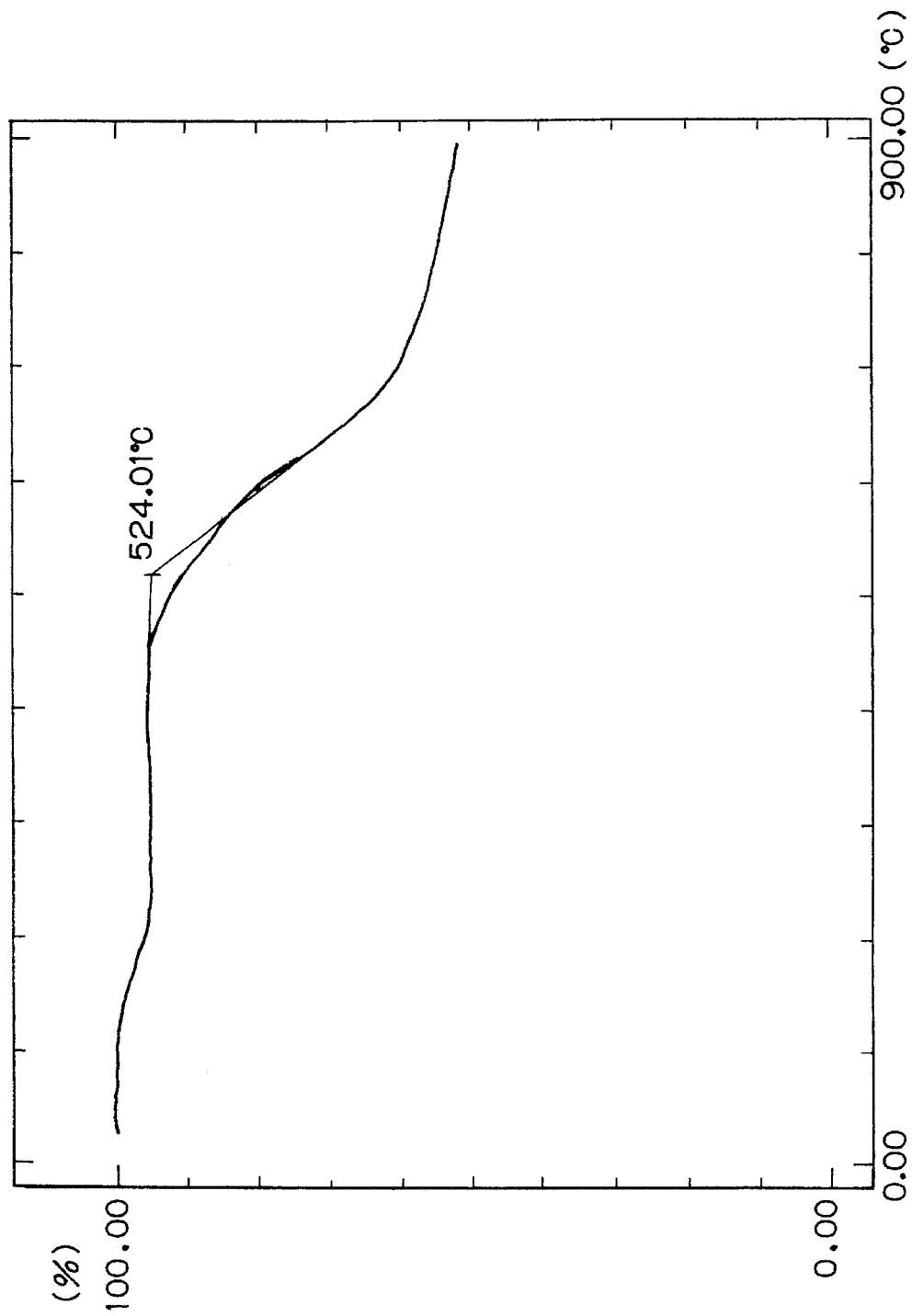
FIG. 2 is a diagram for the TG curve of the polyimide resin as produced in Example 1.

The polyimide powder was subjected to thermal analysis showing 260.0° to 271.6° C. in glass transition temperature (Tg) and 524.01° C. in thermal decomposition temperature as shown in FIGS. 1 and 2, respectively.

EXAMPLE 2

A 500-ml three-necked flask was used for repeating the procedure of Example 1 using 16.11 g (50 mmoles) of BTDA, 5.41 g (25 mmoles) of 4,4'-diaminodiphenyl sulfide (molecular weight 216.3, product of Wakayama Seika), 0.86 g (10 mmoles) of crotonic acid, 2.0 g (25 mmoles) of pyridine, 80 g of NMP and 30 g of toluene. They were held at room temperature for 30 minutes and heated at 140° C. for 30 minutes and at 180° C. for 1 hour with stirring. The reaction mixture was cooled in air, followed by addition of 10.81 g (25 mmoles) of m-BAPS, 50 g of NMP and 30 g of toluene. The resulting mixture was maintained at room temperature for 1 hour and heated at 140° C. for 30 minutes and then at 180° C. for 2 hours with stirring (250 r.p.m.). One hour after the start of heating at 180° C., 14 ml of toluene-water was removed, and water formed and toluene refluxed was removed during the reaction.

The resulting polyimide solution was poured into methanol, stirred in a mixer to obtain a yellow polyimide powder. The powder was filtered off, washed with methanol, and dried, giving 31.3 g of polyimide. The powder was subjected to thermal analysis, giving 241° to 252° C. in Tg and 566° C. in thermal decomposition temperature.

EXAMPLE 3

Substantially the same procedure as in Example 2 was carried out using 16.11 g (50 mmoles) of BTDA, 8.71 g (25 mmoles) of 9,9-bis(4-aminophenyl)fluorene (molecular weight 348.5, product of Wakayama Seika), 0.86 g (10 mmoles) of crotonic acid, 2.0 g (25 mmoles) of pyridine, 80 g of NMP and 30 g of toluene.

The mixtures were maintained at room temperature for 30 minutes and heated at 40° C. for 30 minutes and 180° C. for 1 hour with stirring, followed by cooling in air and then by addition of 10.81 g (25 mmoles) of m-BAPS, 50 g of NMP and 30 g of toluene. The resulting mixture was maintained at room temperature for 1 hour and heated at 140° C. for 30 minutes and at 180° C. for 2 hours with stirring, giving a polyimide solution. The solution was cast onto a glass plate and heated in an IR oven at 120° C. to obtain a polyimide film. The polyimide solution was treated in the same manner as in Example 2 to obtain a polyimide powder.

Tg 266°–284° C., thermal decomposition temperature 552° C.

EXAMPLE 4

Substantially the same procedure as in Example 1 was carried out using a 1-liter three-necked flask. Placed into the flask were 32.22 g (100 mmoles) of BTDA, 21.63 9 (50 mmoles) of m-BAPS, 1.0 g, (10 mmoles) of γ-valerolactone (molecular weight 100.12, product of Tokyo Kasei), 1.6 g (20 mmoles) of pyridine, 150 g of NMP and 40 g of toluene. While introducing nitrogen into the flask, the mixtures were maintained at room temperature for 30 minutes and heated at 180° C. for 1 hour with stirring. The mixture was cooled in air, followed by addition of 2.75 (25 mmoles) of 2,6-diaminopyridine (molecular weight 110.14, product of Aldrich), 3.80 g (25 mmoles) of 3,5-diaminobenzoic acid (molecular weight 152.15, product of Tokyo Kasei), 150 g of NMP and 40 g of toluene. The resulting mixture was maintained at room temperature for 1 hour and heated at 160° C. for 30 minutes and then at 180° C. for 3 hours with stirring. One hour after the start of heating at 180° C., the toluene refluxed was removed during the reaction.

A polyimide solution obtained was cast onto a glass plate and heated at 150° C. in an IR oven, whereby a polyimide film was obtained.

The polyimide solution was poured into an excess of methanol, followed by stirring in a mixer and collection of a powder by filtration. The product was subjected to thermal analysis and found to be 240° C. in Tg and 570° C. in thermal decomposition temperature.

EXAMPLE 5

The procedure employed was substantially the same that of Example 4.

32.22 g (100 mmoles) BTDA, 21.63 g (50 mmoles) m-BAPS, 1.0 g (10 mmoles) γ-valerolactone, 1.6 g (20 mmoles) pyridine, 150 g NMP and 40 g toluene was added in the three-necked flask to prepare a mixture solution. Then the mixed solution was agitated at room temperature for 30 minutes, at 180° C. for one hour in a stream of nitrogen gas. The reaction solution was cooled in air, and then 6.21 g (25 mmoles) of 3,3'-diamino-diphenylsulfone (molecular weight 248.3, product of Wakayama Seika), 6.21 g (25 mmoles) of m-BAPS, 100 g of NMP and 30 g of toluene was added to the reaction solution. The reaction mixture was agitated at room temperature for one hour, at 140° C. for 30 minutes, at 180° C. for three hours. One hour after start of heating at 180° C., water formed and toluene refluxed were removed during the reaction. The reaction solution thus obtained was treated in the same manner as in Example 4 to give polyimide powder. The glass transition temperature by the DSC measurement was 222° C., the thermal decomposition temperature of the powder was 581° C.

EXAMPLE 6

Substantially the same procedure as in Example 4 was carried out using 32.22 g (100 mmoles) of BTDA, 21.63 g (50 mmoles) of m-BAPS, 1.7 g (20 mmoles) of crotonic acid, 2.0 g (20 mmoles) of N-methyl morpholine, 150 g of NMP and 40 g of toluene. They were maintained at room temperature for 30 minutes and heated at 180° C. for 1 hour with stirring. The mixture was cooled in air, followed by addition of 9.31 g (25 mmoles) of 3,3'-dimethyl- 4,4'-diaminodiphenyl-4,4'-disulfonic acid (molecular weight 372.4, product of Wakayama Seika), 6.113 g (25 mmoles) of 3,3'-dimethoxy-4,4'-diaminobiphenyl (molecular weight 244.3, product of Wakayama Seika), 6 g (75 mmoles) of pyridine, 150 g of NMP and 30 g of toluene. The resulting mixture was maintained at room temperature for 1 hour and heated at 140° C. for 30 minutes and at 180° C. for 3 hours with stirring. One hour after the start of heating at 180° C., refluxing toluene was removed during the reaction.

The polyimide solution obtained was poured into a large amount of methanol, causing a polyimide powder to separate out. The powder was filtered off, washed with methanol, dried and subjected to thermal analysis.

Tg 282° C., thermal decomposition temperature 513° C.

EXAMPLE 7

Substantially the same procedure as in Example 2 was carried out using a 500-ml three-necked flask, in which were placed 12.41 g (50 mmoles) of bicyclo-[2,2,2]oct-7-ene-2,3,5,6-tetracarboxylic dianhydride (molecular weight 248.19, product of Aldrich Chemical, hereinafter referred to as "BCD"), 3.05 g (25 mmoles) of 2,4-diaminotoluene, 1.3 g (15 mmoles) of crotonic acid, 2.0 g (25 mmoles) of pyridinic, 150 g of NMP and 30 g of toluene. While introducing nitrogen into the flask, they were maintained at room temperature for 30 minutes and heated at 170° C. for 1 hour with stirring. The mixture was then cooled in air, followed by addition of 8.06 g (25 mmoles) of BTDA, 14.62 g (50 mmoles) of 1,3-bis(3-aminophenoxy)benzene (molecular weight 292.3, product of Mitsui Toatsu), 100 g of NMP and 30 g of toluene. The resulting mixture was maintained at room temperature for 1 hour and heated at 140° C. for 30 minutes and at 180° C. for 2 hours with stirring.

Figure 3:
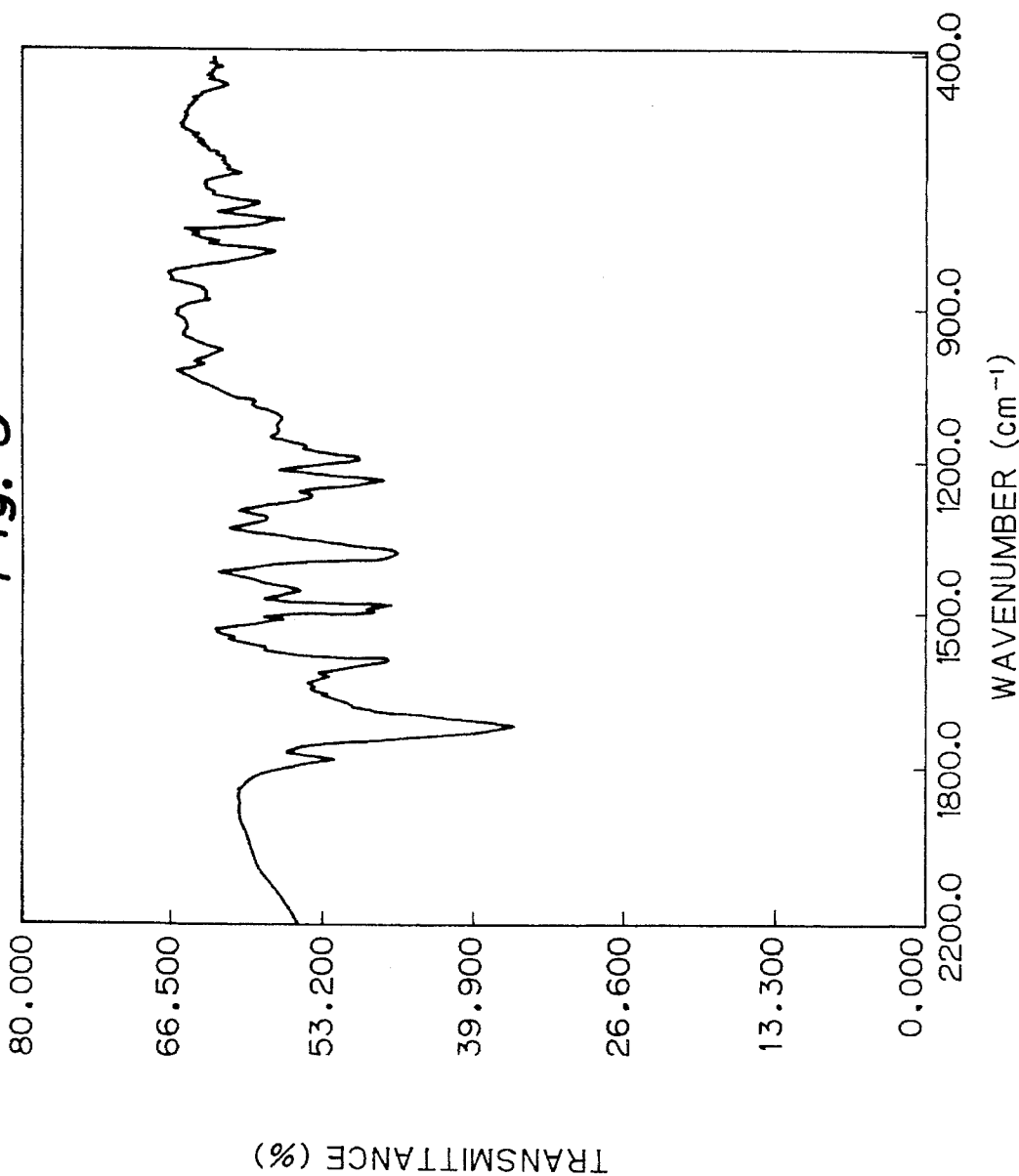
FIG. 3 is a diagram for the IR absorption spectrum curve of the polyimide resin as produced in Example 7.

One hour after the start of heating at 180° C., refluxing toluene was removed during the reaction. A polyimide solution obtained was then cast onto a glass plate and dried at 150° C. in an IR oven to form a polyimide film. Thermal analysis of polyimide powder showed 221° to 234° C. in Tg and 452° C. in thermal decomposition temperature. IR absorption spectrum (FIG. 3) showed characteristic absorption peaks of imide at 717, 1373, 1717 and 1781 cm$^{-1}$.

EXAMPLE 8

Substantially the same procedure as in Example 2 was carried out using 29.00 g (90 mmoles) of BTDA, 3.66 g (30 mmoles) of 2,4-diaminotoluene, 1.0 g (10 mmoles) of γ-valerolactone (molecular weight 100.12, product of Tokyo Kasei), 2.0 g (20 mmoles) of N-methylmorpholine, 130 g of NMP and 30 g of toluene. They were maintained at room temperature for 30 minutes and heated at 180° C. for 1 hour with stirring (250 r.p.m.). The mixture was then cooled in air, followed by addition of 12.98 g (30 mmoles) of m-BAPS, 12.32 g (30 mmoles) of 2,2-bis[4-(4-aminophenoxy)phenyl]propane (molecular weight 410.5, product of Wakayama Seika, hereinafter referred to as "BAPP"), 3.0 g (30 mmoles) of N-methylmorpholine, 100 g of NMP and 20 g of toluene. The resulting mixture was maintained at room temperature for 1 hour and heated at 140° C. for 30 minutes and at 180° C. for 3 hours with stirring. One hour after the start of heating at 180° C., the refluxing substance was removed during the reaction giving a polyimide solution of high viscosity.

The solution was cast onto a glass panel and dried at 150° C. in an IR oven to form a polyimide film. When the polyimide solution was cast onto a chromium-plated panel and heated at 200° C. in an IR oven, a polyimide coating was formed. When subjected to a cross-cut test (1 mm, 10×10), the film remained free of separation.

EXAMPLE 9

The silicone oil (X-22-161-AS, product of Shin-Estu Chemical Co., Ltd) having an amino group at opposite ends and represented by the following formula will be referred to as "diaminosiloxane."

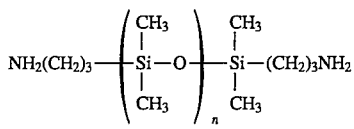

Substantially the same procedure as in Example 1 was carried out. Into the flask were placed 22.56 g (70 mmoles) of BTDA, 9.0 g (10 mmoles) of diaminosiloxane (450 in amine equivalent, X-22-161-AS, product of Shin-Etsu Chemical), 1.5 g (15 mmoles) of γ-valerolactone, 2.4 g (30 mmoles) of pyridine, 100 g of NMP and 30 g of toluene. While introducing nitrogen into the flask, they were maintained at room temperature for 30 minutes and heated at 140° C. for 30 minutes and at 160° C. for 1 hour with stirring (200 r.p.m.). The mixture was then cooled in air, followed by addition of 20.74 g (40 mmoles) of 2,2-bis[4-(4-aminophenoxy)-phenyl] hexafluoropropane (molecular weight 518.5, product of Wakayama Seika), 4.00 g (20 mmoles) of 3,4'-diaminodiphenyl ether (molecular weight 200.2, product of Wakayama Seika), 150 g of NMP and 30 g of toluene.

The resulting mixture was maintained at room temperature for 1 hour and heated at 110° C. for 30 minutes and at 180° C. for 3 hours with stirring.

One hour after the start of heating at 180° C., the refluxing substance was removed during the reaction. The siloxane-containing polyimide solution remained unchanged in viscosity even when allowed to stand at room temperature for 1 month. The solution was castable as it was for use as a film. The solution was added to a large amount of methanol, followed by pulverization in a mixer to obtain a polyimide powder. The powder was found to be 195° C. to 202° C. in Tg and 510° C. in thermal decomposition temperature by thermal analysis.

EXAMPLE 10

Figure 4:
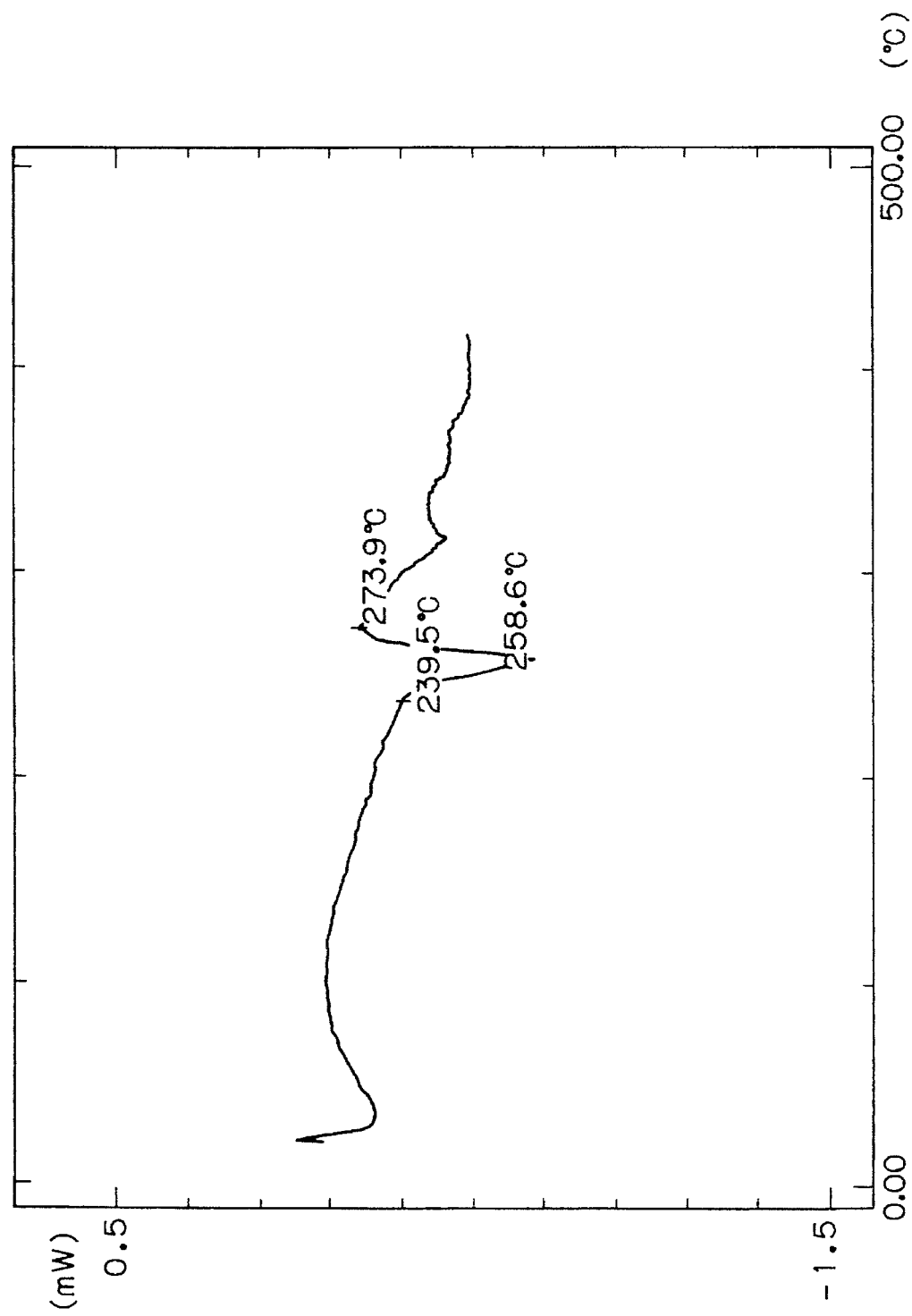
FIG. 4 is a diagram for the DSC curve of the polyimide resin as produced in Example 10.
Figure 5:
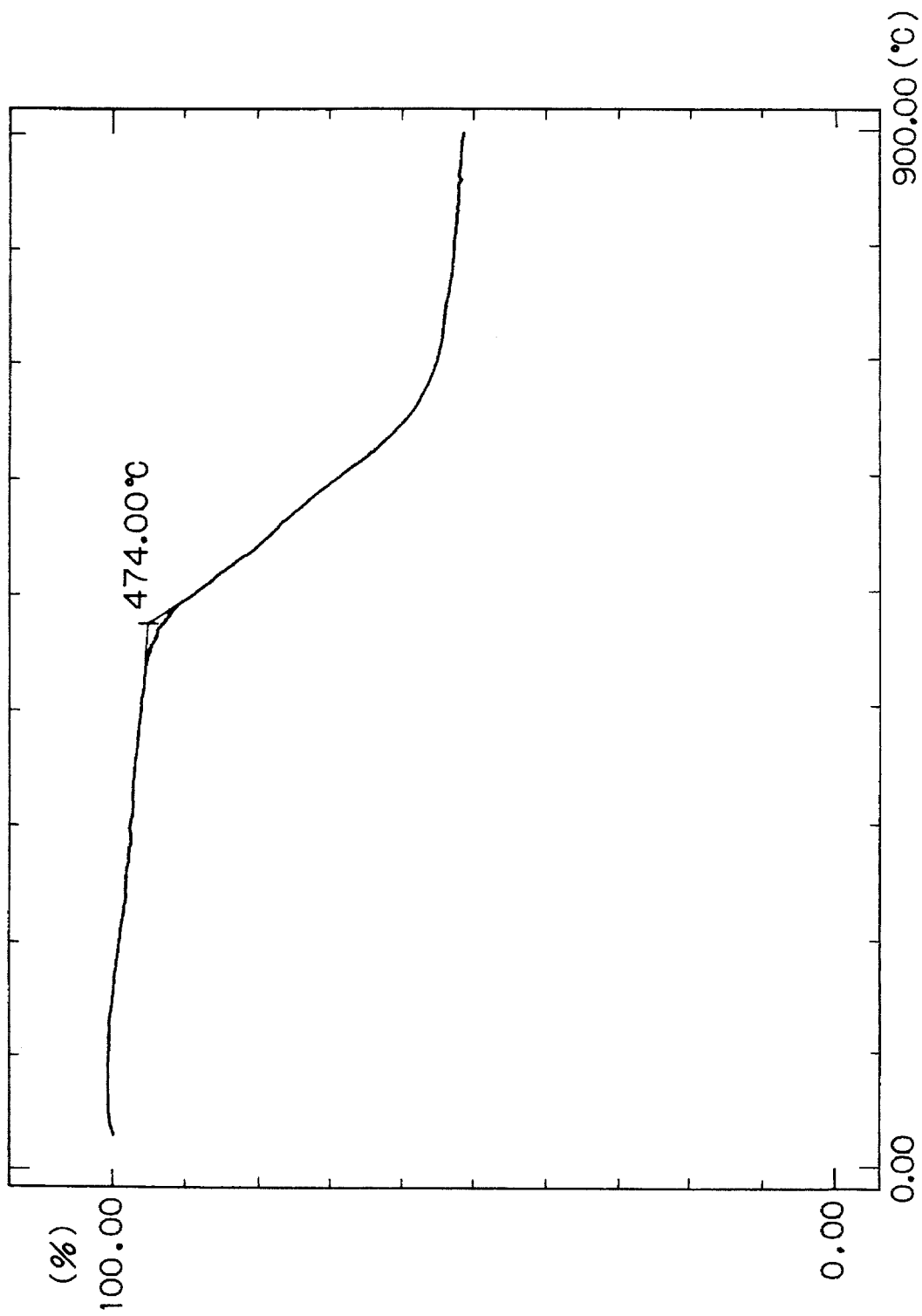
FIG. 5 is a diagram for the TG curve of the polyimide resin as produced in Example 10.

Into a 500-ml three-necked separable flask were placed 22.56 g (70 mmoles) of BTDA, 9.0 g (10 mmoles) of diaminosiloxane (X-22-161-AS), 1.5 g (10 mmoles) of γ-valerolactone, 2.4 g (30 mmoles) or pyridine, 100 g of NMP and 30 g of toluene. They were maintained at room temperature for 30 minutes and heated at 140° C. for 30 minutes and at 160° C. for 1 hour with stirring. The mixture was cooled in air, followed by addition of 12.98 g (60 mmoles) of 4,4'-diaminodiphenyl sulfide (molecular weight 216.3, product of Wakayama Seika), 150 g of NMP and 30 g of toluene. The resulting mixture was maintained at room temperature for 1 hour and heated at 160° C. for 30 minutes and at 180° C. for 2 hours with stirring. The refluxing toluene was removed during the reaction after heating at 180° C. for 1 hour. When thermally analyzed in the same manner as in Example 9, the resulting polyimide powder was found to be 240° to 274° C. in Tg (FIG. 4) and 474° C. in thermal decomposition temperature (FIG. 5).

EXAMPLE 11

Into a flask were placed 5.88 g (20 mmoles) of 3,4,3',4'-biphenyltetracarboxylic dianhydride (molecular weight 292, 224, product of Ube Industries, Ltd., hereinafter referred to as "S-BPDA"), 4.22 g (5 mmoles) of diaminosiloxane (product of Shin-Etsu Chemical, amine equivalent 422), 0.5 g (5 mmoles) of γ-valerolactone, 0.8 g (10 mmoles) of pyridine, 70 g of NMP and 30 g of toluene. In a nitrogen stream, they were maintained at room temperature for 15 minutes and heated at 60° C. for 30 minutes and at 160° C. for 1 hour with stirring (200 r.p.m.). The mixture was then cooled in air, followed by addition of 6.44 g (20 mmoles) of BTDA, 14.37 g (35 mmoles) of BAPP, 54 g of NMP and 20 g of toluene. The resulting mixture was maintained at room temperature for 30 minutes, heated at 140° C. for 30 minutes and at 180° C. for 3 hours with stirring. During the period following the heating at 180° C. for 1 hour, the refluxing substance was removed from the system, whereby a siloxane-containing polyimide solution was obtained. The solution afforded a polyimide powder, which was found to be 207° C. in Tg and 536° C. in thermal decomposition temperature.

EXAMPLE 12

Into a flask were placed 23.52 g (80 mmoles) of S-BPDA, 16.88 g (20 mmoles) of diaminosiloxane (amine equivalent 422, product of Shin-Etsu Chemical), 1.72 g (20 mmoles) of crotonic acid, 6.4 g (80 mmoles) of pyridine, 200 g of NMP and 40 g of toluene. In a nitrogen stream, they were maintained at room temperature for 20 minutes and heated at 170° C. for 90 minutes with stirring. The mixture was then cooled in air, followed by addition of 19.84 g (80 mmoles) of BCD, 40.92 g (140 mmoles) of m-TPE, 137 g of NMP and 40 g of toluene. The resulting mixture was maintained at room temperature for 30 minutes and heated at 180° C. for 3.5 hours with stirring. After heating at 180° C. for 1 hour, refluxing toluene was removed during the reaction. 98 g of solvent mixture of toluene and dioxane (1:1 in weight ratio) was added to the resulting reaction mixture, consequently given a polyimide solution having a concentration of 19% weight. The solution was cast onto a glass panel and heated at 120° C. in an IR oven to remove the solvent almost completely and form a film. The film was heated in a vacuum at 220° C. for 2 hours for drying, giving a polyimide film of improved strength.

The polyimide powder (0.5 g) was dissolved in 100 ml of NMP, and the viscosity was measured at 30° C., inh=0.18.

Tg 208° C., thermal decomposition temperature 449° C.

Figure 6:
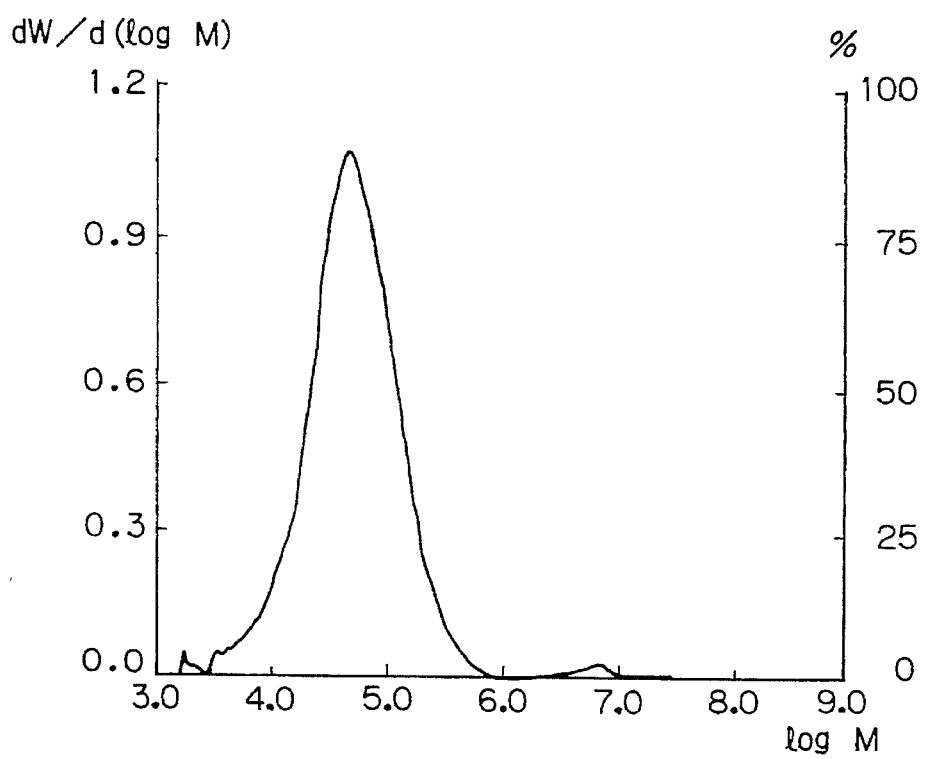
FIG. 6 is a diagram for the GPC curve of the polyimide resin as produced in Example 12.

Molecular weight determined by GPC was $M_N$ 36000, (number average molecular weight) and $M_w$ 150,000 (weight average molecular weight), based on the standard polystyrene molecular weight as shown in FIG. 6.

T-peel strength 650 kg/cm. The adherent was determined between polyimide film (Kapton H, 1 mil in thickness treated by sputtering), and copper foil (Nikko DHN-02, 35 µm in thickness).

The polyimide solution was cast on the Kapton film and thereafter dried (85° C.×30 min+150° C.×60 min) to form an adhesive layer of about 25 µm. The copper foil was affixed to the film and bonded thereto under the condition of 30° C.×60 min×20 kg/cm². The sample was etched over a width of 1 mm and treated for peel resistance at 90° C. The pulling speed was 50 mm/min.

The polyimide solution was cast on a glass panel and heated at 200° C. in an IR oven to form a polyimide film. It was found hard to peel off the polyimide film from the glass panel by a cross-cut test.

The transparent polyimide film may be useful for coating usual window lass and the window lass of ships, vehicles and aircraft for the purpose to block heat or light, and prevent deposition of water droplets.

EXAMPLE 13

Into a 1-liter separable flask were placed 11.77 (40 mmoles) of S-BPDA, 18.0 g (20 mmoles) of diaminosilane (amine equivalent 450), 3.41 g (80 mmoles) of crotonic acid, 6.4 g 80 mmoles) of pyridine, 240 g of NMP and 40 of toluene. The materials were maintained at room temperature for 30 minutes and heated at 140° C. for 30 minutes and at 170° C. for 1 hour with stirring (20 r.p.m) while introducing nitrogen into the flask. The mixture was then cooled in air, followed by addition of 16.016 g (80 mmoles) of 3,4'-diaminodiphenyl ether, 39.71 g (160 mmoles) of BCD, 200 g of NMP and 40 g of toluene. The resulting mixture was heated at 140° C. for 30 minutes and at 170° C. for 1 hours with stirring, and cooled in air, followed by addition of 43.25 (100 mmoles) of m-BAPS, 120 g of NMP and 40 g of toluene and further by heating at 140° C. for 30 minutes and at 180° C. for 3 hours with stirring. During the period following heating at 180° C. for 1 hour, the refluxing substance was removed from the system. The above procedure yielded a polyimide solution, which was then cast on a glass panel and heated to 120° C. in an IR dryer. When the coated panel was dipped in water, a transparent polyimide film was obtained. When the polyimide solution as cast on a glass panel was heated at 200° C. in the IR dryer, a polyimide coating was formed. When subjected to a cross-cut test, the polyimide film remained unseparable from the glass panel. When required, the solution is colored for use in coating glass, ceramic or metal surfaces. The polyimide solution is transparent and useful for coating usual window glass and the window glass of ships, vehicles and aircraft to block heat or light and prevent deposition of water droplets. When the polyimide solution was added to a large amount of methanol, followed by pulverization in a mixer, a polyimide powder was obtained.

Tg was not determined by thermal analysis. Thermal decomposition temperature was 429° C.

EXAMPLE 14

Polyimide solution was prepared by repeating the same reaction procedure as in Example 13 except that 43.25 (100 mmoles) of m-BAPS was replaced by 51.85 g (100 mmoles) of 2,2-bis[4-(4-aminophenoxy)phenyl]hexafluoropropane (molecular weight 518.4, product of Wakayama Seika) or 41.05 g (100 mmoles) of BAPP (molecular weight 410.5) or 29.23 g (100 mmoles) of 1,3-bis(3-aminophenoxy)benzene (molecular weight 292.3, product of Mitsui Toatsu), respectively.

The solutions afforded polyimide powders, which were found to be 240° C., 252° C. or 196° C. respectively in Tg by thermal analysis. The inherent viscosity was 0.25, 0.35, and 0.17, respectively.

EXAMPLE 15

Block polyimide solution for spray coating and process for preparing same

Substantially the same procedure as in Example 1 was carried out using 35.31 g (120 mmoles) of S-BPDA, 27.48 g (30 mmoles) of diaminosiloxane (amine equivalent 458, product of Shin-Etsu Chemical), 2.58 g (30 mmoles) of crotonic acid, 4.75 g (60 mmoles) of pyridine, 150 g of NMP and 40 g of toluene. They were maintained at room temperature for 30 minutes and heated at 160° C. for 1 hour with stirring. The mixture was then cooled in air, followed by addition of 29.78 g (120 mmoles) of BCD, 62.85 g (215 mmoles) of m-TPE, 1.48 g (10.02 mmoles) of phthalic anhydride, 144 g of NMP and 40 g of toluene. The resulting mixture was maintained at room temperature for 1 hour and heated at 140° C. for 30 minutes and at 180° C. for 4.5 hours with stirring. After heating at 180° C. for 1 hour, the refluxing substance was removed during the reaction.

Figure 7:
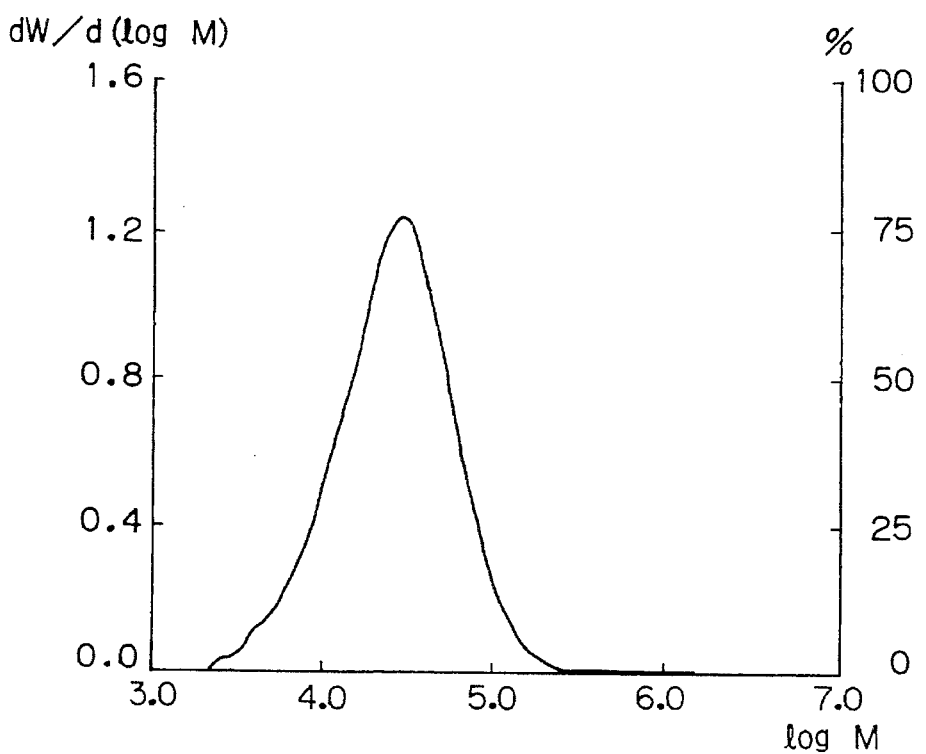
FIG. 7 is a diagram for the molecular-weight distribution curve of the polyimide resin as produced in Example 16.

The above procedure produced a polyimide solution with a concentration of 35%, to which a diluent (toluene:dioxane=1:1 by weight) was added in an amount of 0.7 times the amount of the solution to reduce the concentration to 20%. The solution diluted was 200 cp. in bubble viscosity. The polyimide solution was measured molecular weight by gel permeation chromatography using (GPC)-Toso-HLC8020 and dimethylformamide as a developing solvent as shown in FIG. 7.

| $M_N$ (number average molecular weight) | 18500 |
|---|---|
| $M_W$ (weight average molecular weight) | 34100 | based on the standard polystyrene molecular weight.

Tg 205° C., decomposition temp. 444° C.

The polyimide reaction mixture was diluted 1.3-fold with a diluent (dioxane:toluene=1:1 by weight) to prepare a varnish containing 15% solids. The varnish was applied by spray coating to SUS 430 stainless steel panels (0.9 mm×75 mm×150 mm) and aluminum panels (1.0 mm×50 mm×60 mm) which were merely decreased. The coatings (2 kg/m²) were treated at 120° to 130° C. for 15 minutes in a drying oven and at 270° C. for 30 minutes in a baking oven.

With the SUS 430 test pieces, the coatings (15 min thickness) had a hardness of 2H (pencil hardness) and proved satisfactory by Erichsen test (pushed out by 8 mm), Du pont impact tester (1 kg, 50 cm, ¼–⅛ in.) and cross-cut test (10×10 1-mm squares, adhesion test resulting in non separation).

With the aluminum test pieces, the coatings (10 µm in thickness), had a hardness of H to 2H and proved free of separation and satisfactory by the same adhesion test.

T-Peel strength 440 g/cm (see Example 12), tensile strength 59 kg/cm² (tested according to ASTM, D882. 10 mm/min, 23° C., dumbbell No. 1, thickness 30 µm).

EXAMPLE 16

Figure 8:
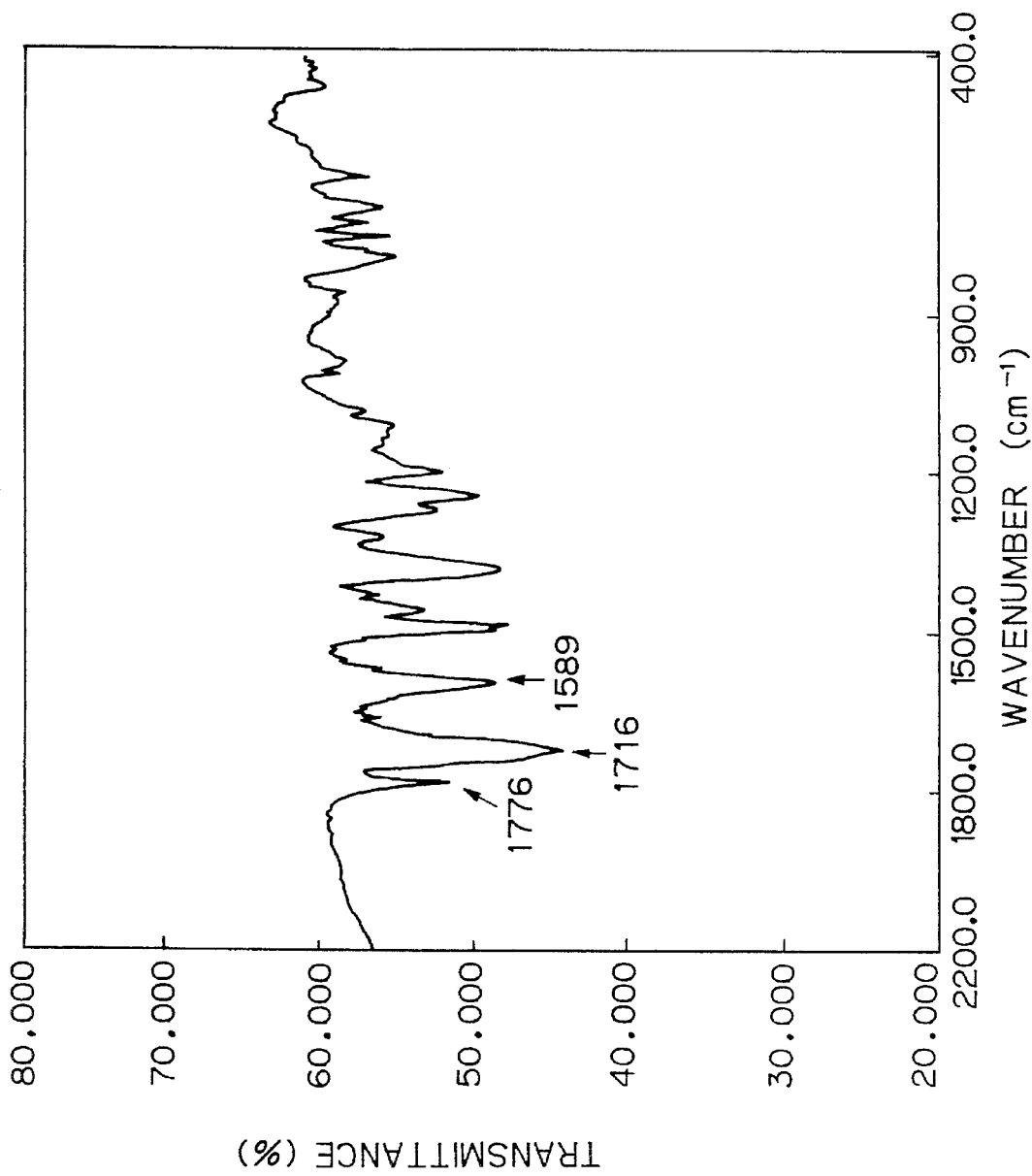
FIG. 8 is a diagram for the infrared absorption curve of the polyimide resin as produced in Example 17.

A 500 ml of three-necked flask was used for the procedure of Example 1 using 5.884 g (20 mmoles) of BPDA, 4.964 g (20 mmoles) of BCD, 11.69 g (40 mmoles) of 1,3-bis[(3-aminophenoxy)benzene], 0.4 g (4 mmoles) of valerolactone, 0.64 g (8 mmoles) of pyridine, 84 g of NMP and 20 g of toluene. The reaction mixture was heated at 180° C. for 4 hours in nitrogen. The solution diluted with an equal amount of NMP showed 500 cp in viscosity. The resulting solution was cast on a glass plate, and heated at 120° C. in an IR oven to form strong film. The solution was poured into methanol, followed by filtration and dryness to collect a powder. Infrared absorption spectrum of the powder was measured as shown in FIG. 8. Characteristic absorption peaks of the imide were detected at 738, 1374, 1716 and 1776 cm$^{-1}$.

REFERENCE EXAMPLE

Figure 9:
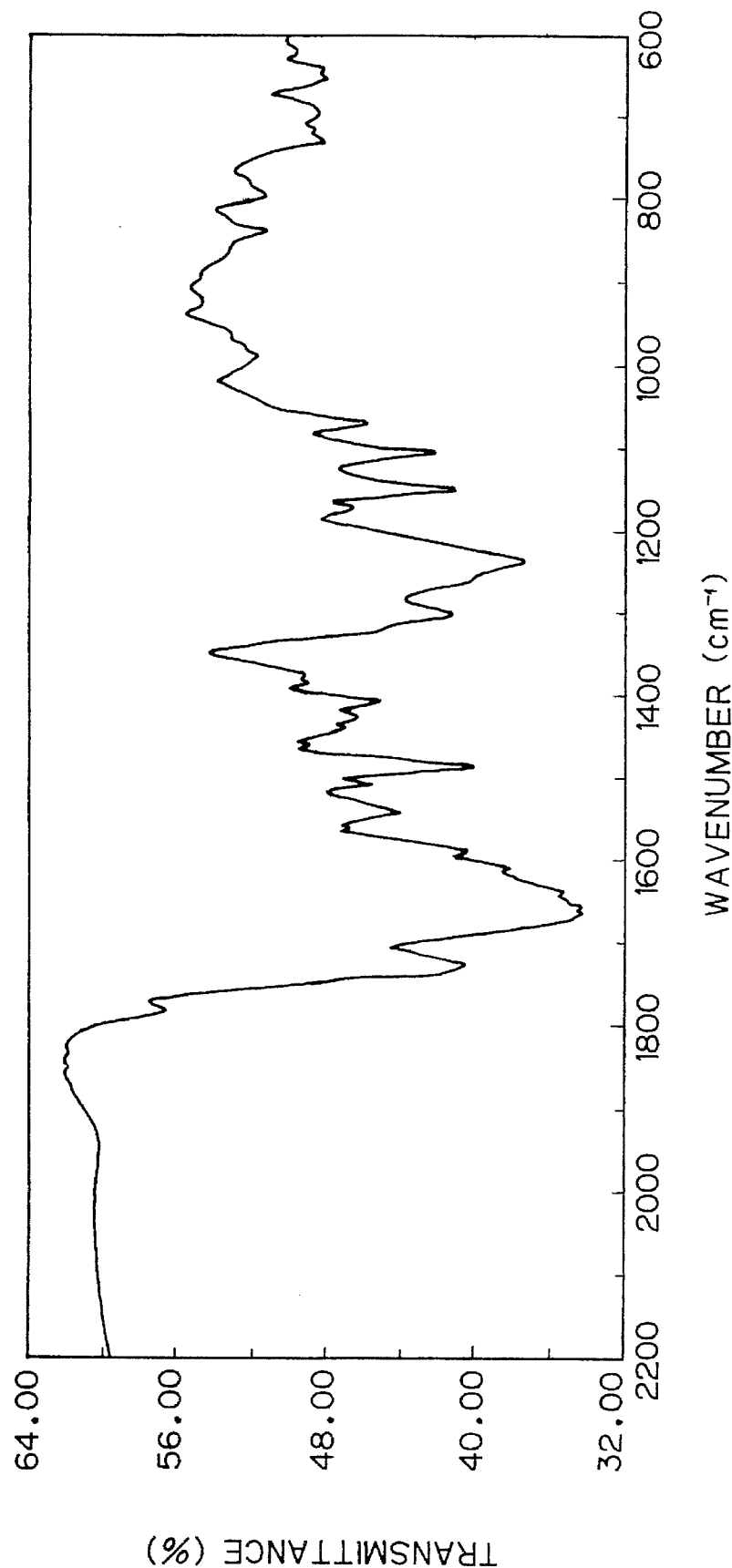
FIG. 9 is a diagram for the IR absorption spectrum curve of the polyimide resin as produced in Reference Example.

The procedure employed was substantially the same as that of Example 16. The mixtures of 5.884 g of BPDA, 4.964 g of BCD, 11.69 g of 1,3-bis[(3-aminophenoxy)benzene], 4.8 g 80 mmoles) acetic acid and 84 g of NMP were heated at 100° C. for 90 minutes in nitrogen. The solution diluted with an equivalent amount of NMP showed 65 cp in viscosity. The reaction mixture was cast on a glass plate not to give any film form. The reaction mixture was poured into excess amount of methanol to form viscus precipitates which were washed with methanol and dried at 120° C. in an IR oven. IR absorption spectrum of this powder was measured as shown in FIG. 9. Characteristics peaks of the imide such as 1716 and 1776 cm$^{-1}$ were not observed, but 1654 cm$^{-1}$ of the amide peak was observed. Therefore, this process produced mainly polyamic acid in place of polyimide.

EXAMPLE 17

Substantially the same procedure as in Example 12 was carried out using 14.89 g (60 mmoles) of BCD, 18.02 g (90 mmoles) of 3,4'-diaminodiphenylether, 3.0 g (30 mmoles) of γ-valerolactone, 4.8 g (60 mmoles) of pyridine, 150 g of NMP and 30 g of toluene. The mixture was heated at 180° C. for one hour. After cooling the solution in air, 19.33 g (60 mmoles) BTDA, 8.769 g (30 mmoles) 1,3-bis[(3-aminophenoxy)benzene], 77 g of NMP and 20 g of toluene. The mixture was heated at 180° C. for 4 hours. After heating at 180° C. for one hour, water formed and toluene were removed during the reaction. The solution was cast on a glass plate and heated at 120° C. for 30 minutes and at 150° C. for one hour in an IR oven, forming strong polyimide film. DSC measurement showed 266° C. in Tg. GPC measurement of the polyimide showed;

| | |
|---|---|
| $M_N$ (number average molecular weight) | 24,300 |
| $M_W$ (weight average molecular weight) | 64,800 | based on standard polystyrene molecular weight.

EXAMPLE 18

Substantially the same procedure as in Example 2 was carried out using 4.964 g (20 mmoles) of BCD, 6.006 g (30 mmoles) of 3,4'-diaminodiphenylether, 0.5 g (5 mmoles) of γ-valerolactone, 1.1 g (10 mmoles) of N-methyl morpholine, 60 g of NMP and 10 g of toluene. The mixture was heated at 180° C. for one hour. After cooling in air, 9.667 g (3 mmoles) of BTDA, 5.846 g (20 mmoles) of 1,3-bis[(3-aminophenoxy)benzene], 70 g of NMP, and 30 of toluene were added. The mixture maintained at room temperature for 30 minutes and heated at 180° C. for 4 hours. The polyimide solution (20% weight in NMP) was cast on a glass plate, and heated at 120° C. for 30 minutes, at 150° C. for one hour in an IR oven, giving strong polyimide film. GPC measurement of polyimide powder showed the molecular weight of $M_N$ 24,300 and $M_w$ 68,400, based on the polystyrene molecular weight. DSC measurement showed 215°–243° C. in Tg.

EXAMPLE 19

Figure 10:
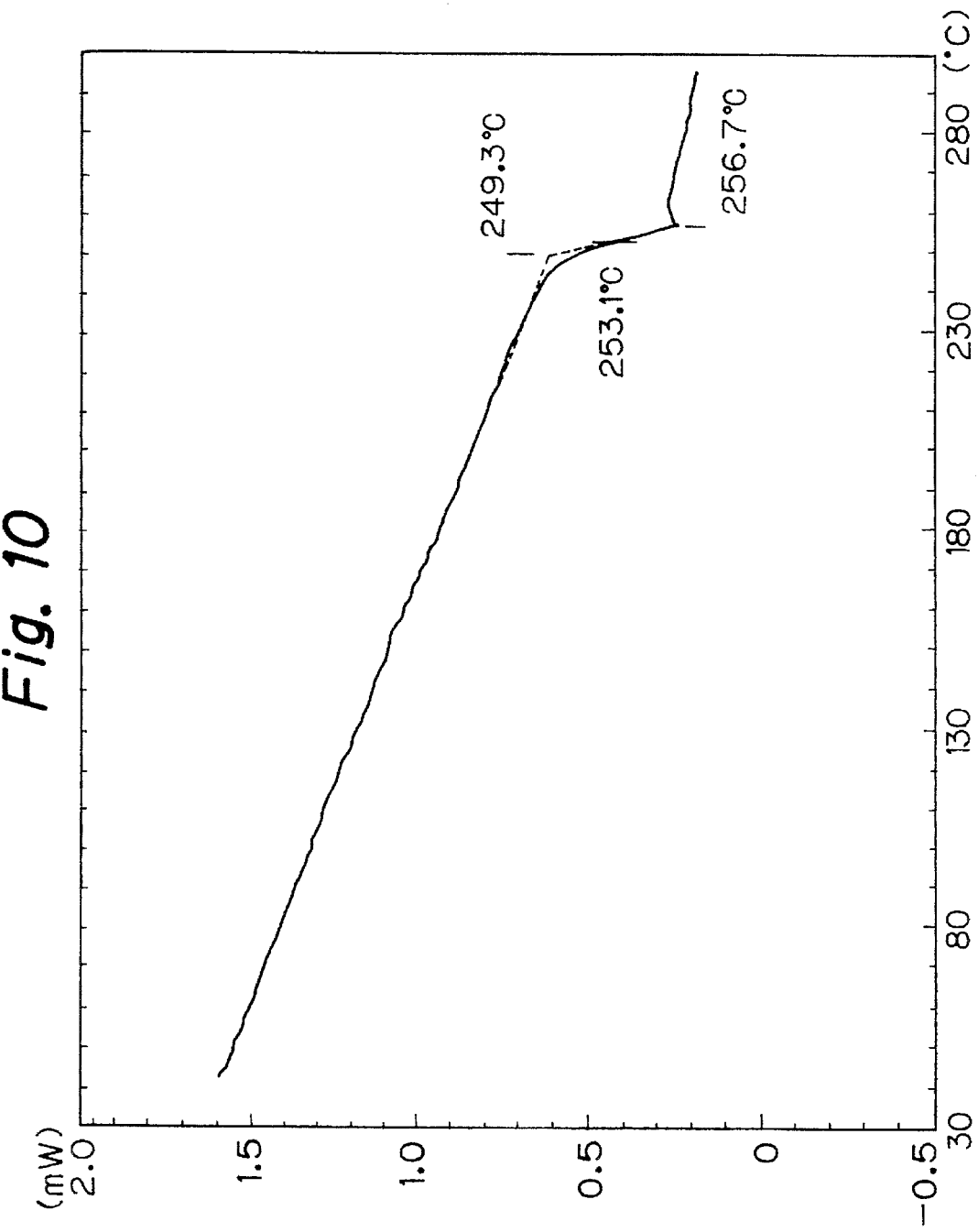
FIG. 10 is a diagram for the TG curve of the polyimide resin as produced in Example 20.
Figure 11:
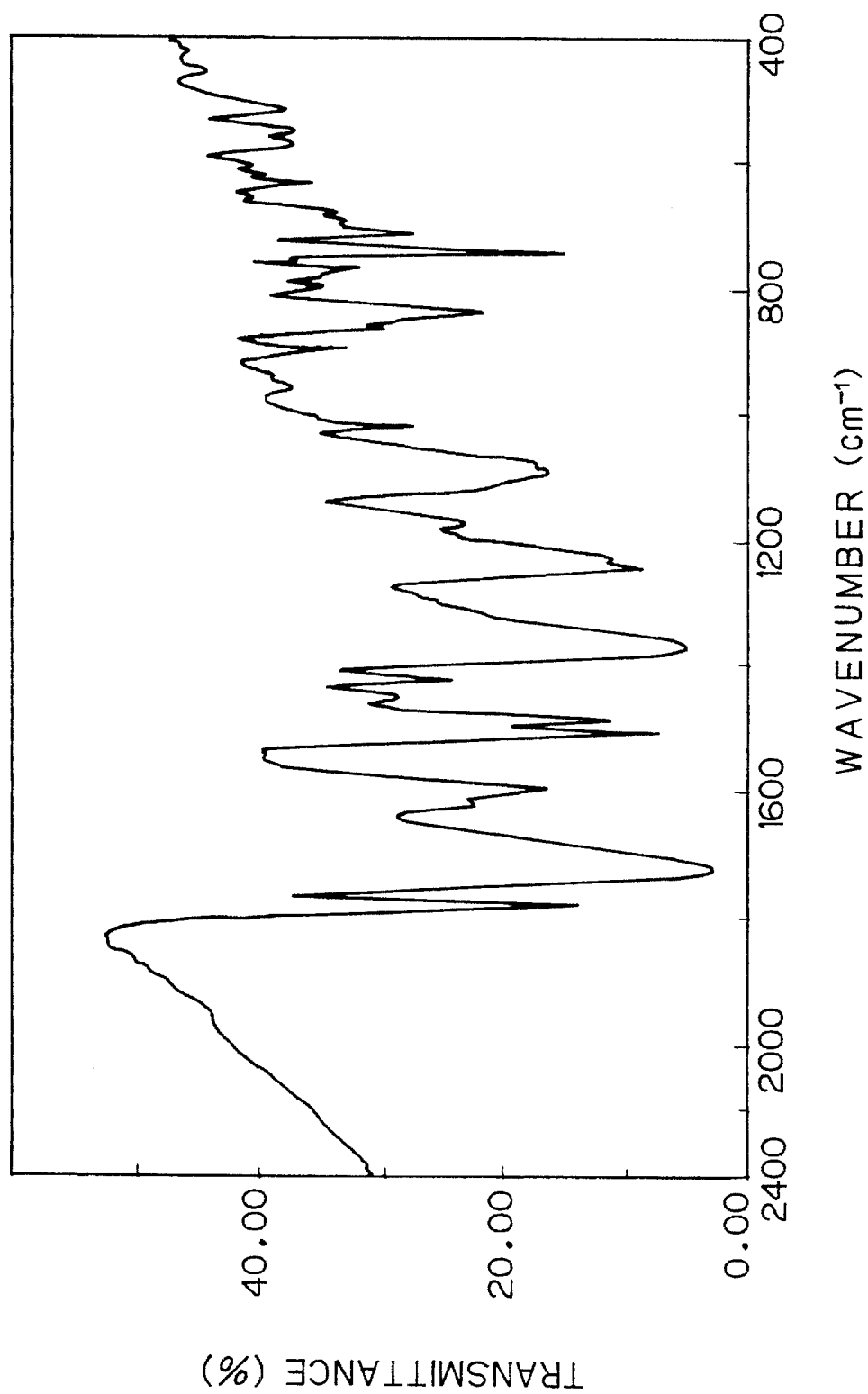
FIG. 11 is a diagram for the infrared absorption curve of the polyimide resin as produced in Example 20.

Substantially the same procedure as in Example 2 was carried out using 8.44 g (20 mmoles) of BPDA, 6.006 g (30 mmoles) of 3,4'-diaminodiphenylether, 0.5 g (5 mmoles) of γ-valerolactone, 0.75 g (10 mmoles) of pyridine, 100 g of NMP and 25 g of toluene. The mixture was heated at 180° C. for one hour. After cooling in air, 8.827 g (30 mmoles) of BPDA, 6.890 g (20 mmoles) of 1,3-bis[1-(4-aminophenyl)-1-methylethylidene]benzene, 50 g of NMP and 20 g of toluene. The mixture was maintained at room temperature for 30 minutes, at 180° C. for 2 hours with stirring. NMP (93 g) was added to the solution, diluting to 15% weight solution. The mixture was further heating at 170° C. for 2.5 hours, removing water formed, and toluene during the reaction. The polyimide solution was cast on a glass plate and forms stirring polyimide film, heating at 120° C. for 30 minutes, at 150° C. for one hour in an IR oven. DSC was measured showing 253° to 260° C. in Tg as shown in FIG. 10. The infrared absorption spectrum showed characteristic absorption peaks of the imide at 738, 1369, 1718 and 1776 cm$^{-1}$ as shown in FIG. 11.

EXAMPLE 20

Substantially the same procedure as in Example 2 was carried out using 11.77 g (40 mmoles) of BPDA, 12.01 (60 mmoles) of 3,4'-diaminodiphenylether, 1.0 g (10 mmoles) of γ-valerolactone, 1.2 g (15 mmoles) of pyridine, 174 g of NMP and 30 g of toluene. The mixture was heated at 180° C. for 1 hour with stirring (200 r.p.m.). After cooling in air, 19.33 g (60 mmoles) of BTDA, 16.42 g (40 mmoles) of 2,2-bis[4-(4-aminophenoxy)phenyl]propane, 50 g of NMP and 30 g of toluene were added. The mixture was maintained at room temperature for 30 minutes, heated at 180° C. for 2 hours with stirring. To the solution, 93 g of NMP was added (adjusted 15% weight concentration), and then the mixture was heated at 170° C. for 2.5 hours, removing water formed and toluene during the reaction. The solution was cast on a glass plate, and heated at 120° C. for 30 minutes, at 150° C. for one hour in an IR oven, forming strong polyimide film. DSC measurement showed 253°–260° C. in Tg.

EXAMPLE 21

Substantially the same procedure as in Example 1 was carried out using 37.23 g (100 mmoles) of BCD, 30.03 g (150 mmoles) of 4,4'-diaminodiphenylether, 43.85 (150 mmoles) of 1,3-bis[(4-aminophenoxy)benzene], 4.5 (45 mmoles) of γ-valerolactone, 7.1 g (90 mmoles) of pyridine, and 400 g of solvent. The solvent is the mixture of NMP; dimethylformamide; anisole; xylene in the same weight, respectively. The mixture was heated at 176° C. for 1 hour with stirring. After cooling in air, 44.13 g (150 mmoles) of BPDA, 178 g of the solvent were added. The mixture was maintained at room temperature for one hour, heated at 180° C. for 3 hours. After heating at 180° C. for one hour, water formed and toluene were removed during the reaction. After adding 238 g of the solvent to the reaction mixture, the reaction was carried out at 180° C. for 4.5 hours, giving 15% weight polyimide solution. The solution was cast on a glass plate and heated at 120° C. for 30 minutes, at 200° C. for 30 minutes in an IR oven, forming a strong polyimide film. DSC measurement showed 257°–267° C. in Tg.

What is claimed is:

1. In the process for preparing polyimide resins comprising:

(A) reacting one mole of a first diamine with about 2–10 moles of an acid dianhydride in an organic polar solvent at a temperature of from 140°–220° C. in the presence of a binary catalyst to form imide oligomers containing more than 80% by weight of an imide monomeric unit;

wherein the acid dianhydride is selected from the group consisting of biphenyltetracarboxylic dianhydride; benzophenonetetracarboxylic dianhydride; 4,4'-[2,2,2-trifluoro- 1-(trifluoromethyl)ethylidene]bis(1,2-benzenedicarboxylic dianhydride); bis(dicarboxylphenyl)ether dianhydride and bicyclo(2,2,2)oct-7-ene-2,3,5,6-tetracarboxylic dianhydride, and the organic polar solvent is selected from the group consisting of N-methyl-2-pyrrolidone, N,N-dimethyl formamide N,N-dimethylacetamide, N-acetyl morpholine and tetramethyl urea;

(B) reacting the imide oligomers with a second diamine so that the total amount of the first diamine and the second diamine is almost equivalent in moles to the acid dianhydride in the reaction solution at a temperature of 140°–220° C. to form a polyimide block polymer solution;

wherein the first diamine is different from the second diamine, and the first and second diamines are selected from the group consisting of 1,4-benzenediamine; 6-methyl-1,3-benzenediamine; 4,4'-diamino-3,3'-dimethyl-1,1'-biphenyl; 4,4'-diamino- 3,3'-dimethoxy-1,1-biphenyl; 4,4'-methylene bis(benzeneamine); 4,4'-oxybis(benzeneamine); 3,4'-oxybis(benzeneamine); 4,4'-thiobis(benzeneamine); 4,4'-sulfonyl(benzeneamine); 3,3'-sulfonyl(benzeneamine); 1-trifluoromethyl-2,2,2-trifluoroethylidene-4,4'-bis(benzeneamine); 2,2-bis[4-(4-aminophenoxy)phenyl]propane; bis[4-(3-aminophenoxy)phenyl]sulfone; 1,3-bis[1-(4-aminophenyl)-1-methylethylidene]benzene; 1,4-bis(4-aminophenoxy)benzene; 1,3-bis(4-aminophenoxy)benzene; 9,9-bis(4-aminophenyl)fluorene and diaminosiloxane;

(C) preparing directly polyimide resins from the polyimide block polymer solution by heat evaporation, thereby removing both the solvent and the binary catalyst;

the improvement wherein the binary catalyst comprises a first component which is a compound selected from the group consisting of γ-valerolactone and crotonic acid and a second component which is a compound selected from the group consisting of pyridine and N-methyl morpholine, said first component being about 0.01–0.2 mole per mole of the acid dianhydride and said second component being about 1–2 moles per mole of the first component.

2. The process according to claim 1, wherein the binary catalyst is one member selected from the group consisting of γ-valerolactone-pyridine, γ-valerolactone-N-methyl morpholine, crotonic acid-N-methyl morpholine and crotonic acid-pyridine.

3. The process according to claim 1, wherein the binary catalyst is γ-valerolactone-pyridine.

4. The process according to claim 1, wherein the binary catalyst is crotonic acid-N-methyl morpholine.

5. The process according to claim 1, wherein a hydrocarbon is further added to the reaction solution in an amount of about 20–50 parts by weight to one part by weight of formed water to facilitate removing the water by azeotropic distillation from the reaction solution during the reaction, said hydrocarbon being selected from the group consisting of toluene, xylene and tetrahydronaphthalene.

6. In the process for preparing polyimide resins comprising:

(A) reacting one mole of a first acid dianhydride with about 1.2–3 moles of a diamine in an organic polar solvent at a temperature of from 140°–220° C. in the presence of a binary catalyst to form imide oligomers;

wherein the diamine is selected from the group consisting of 1,4-benzenediamine; 6-methyl-1,3-benzenediamine; 4,4'-diamino- 3,3'-dimethyl-1,1'-biphenyl; 4,4'-diamino-3,3'-dimethoxy-1,1-biphenyl; 4,4'-methylene bis(benzeneamine); 4,4'-oxybis(benzeneamine); 3,4'-oxybis(benzeneamine); 4,4'-thiobis(benzeneamine); 4,4'-sulfonyl(benzeneamine); 3,3'-sulfonyl(benzeneamine); 1-trifluoromethyl 2,2,2-trifluoroethylidene-4,4'-bis(benzeneamine); 2,2-bis[4-(4-aminophenoxy)phenyl]propane; bis[4-(3-aminophenoxy)phenyl]sulfone; 1,3-bis[1-(4-aminophenyl)-1-methylethylidene]benzene; 1,4-bis(4-aminophenoxy)benzene; 1,3-bis(4-aminophenoxy)benzene; 9,9-bis(4-aminophenyl)fluorene and diaminosiloxane; and the organic polar solvent is selected from the group consisting of N-methyl-2-pyrrolidone, N,N-dimethylformamide, N,N-dimethylacetamide, N-acetyl morpholine and tetramethyl urea;

(B) reacting the imide oligomers with a second acid dianhydride so that the total amount of the first acid dianhydride and the second acid dianhydride is almost equivalent in moles to the diamine in the reaction solution at a temperature of 140°–220° C. to form a polyimide block polymer solution;

wherein the first acid dianhydride is different from the second acid dianhydride, and the first and second dianhydride are selected from the group consisting of biphenyltetracarboxylic dianhydride; benzophenonetetracarboxylic dianhydride; 4,4'-[2,2,2-trifluoro-1-(trifluoromethyl)ethylidene]bis(1,2-benzenedicarboxylic dianhydride); bis(dicarboxylphenyl)ether dianhydride and bicyclo(2,2,2)oct-7-ene-2,3,5,6-tetracarboxylic dianhydride; and (C) preparing directly polyimide resins from the polyimide block polymer solution by heat evaporation, thereby removing both the solvent and the binary catalyst;

the improvement wherein the binary catalyst comprises a first component which is a compound selected from the group consisting of γ-valerolactone and crotonic acid and a second component which is a compound selected from the group consisting of pyridine and N-methyl morpholine, said first component being about 0.01–0.2 mole per mole of the acid dianhydride and said second component being about 1–2 moles per mole of the first component.

7. The process according to claim 6, wherein the binary catalyst is one member selected from the group consisting of γ-valerolactone-pyridine, γ-valerolactone-N-methyl morpholine, crotonic acid-N-methyl morpholine and crotonic acid-pyridine.

8. The process according to claim 6, wherein the binary catalyst is γ-valerolactone-pyridine.

9. The process according to claim 6, wherein the binary catalyst is crotonic acid-N-methyl morpholine.

10. The process according to claim 6, wherein a hydrocarbon is further added to the reaction solution in an amount of about 20–50 parts by weight to one part by weight of formed water to facilitate removing the water by azeotropic distillation from the reaction solution during the reaction, said hydrocarbon being selected from the group consisting of toluene, xylene and tetrahydronaphthalene.

11. The process according to claim 2 wherein a hydrocarbon is further added to the reaction solution in an amount of about 20–50 parts by weight to one part by weight of formed water to facilitate removing the water by azeotropic distillation from the reaction solution during the reaction, said hydrocarbon being selected from the group consisting of toluene, xylene and tetrahydronaphthalene.

12. The process according to claim 3 wherein a hydrocarbon is further added to the reaction solution in an amount of about 20–50 parts by weight to one part by weight of formed water to facilitate removing the water by azeotropic distillation from the reaction solution during the reaction, said hydrocarbon being selected from the group consisting of toluene, xylene and tetrahydronaphthalene.

13. The process according to claim 4 wherein a hydrocarbon is further added to the reaction solution in an amount of about 20–50 parts by weight to one part by weight of formed water to facilitate removing the water by azeotropic distillation from the reaction solution during the reaction, said hydrocarbon being selected from the group consisting of toluene, xylene and tetrahydronaphthalene.

14. The process according to claim 7 wherein a hydrocarbon is further added to the reaction solution in an amount of about 20–50 parts by weight to one part by weight of formed water to facilitate removing the water by azeotropic distillation from the reaction solution during the reaction, said hydrocarbon being selected from the group consisting of toluene, xylene and tetrahydronaphthalene.

15. The process according to claim 8 wherein a hydrocarbon is further added to the reaction solution in an amount of about 20–50 parts by weight to one part by weight of formed water to facilitate removing the water by azeotropic distillation from the reaction solution during the reaction, said hydrocarbon being selected from the group-consisting of toluene, xylene and tetrahydronaphthalene.

16. The process according to claim 9 wherein a hydrocarbon is further added to the reaction solution in an amount of about 20–50 parts by weight to one part by weight of formed water to facilitate removing the water by azeotropic distillation from the reaction solution during the reaction, said hydrocarbon being selected from the group consisting of toluene, xylene and tetrahydronaphthalene.

* * * * *